United States Patent [19]

Sorimachi et al.

[11] 3,877,046
[45] Apr. 8, 1975

[54] COLLAPSIBLE SINGLES LENS REFLEX CAMERA

[75] Inventors: Kanehiro Sorimachi, Yokohama; Hiroshi Aizawa, Tokyo, both of Japan

[73] Assignee: Canon Kabushiki Kaisha, Tokyo, Japan

[22] Filed: May 31, 1974

[21] Appl. No.: 475,269

[30] Foreign Application Priority Data
June 4, 1973  Japan.............................. 48-62732

[52] U.S. Cl................................ 354/158; 354/187
[51] Int. Cl. ........................................... G03b 19/12
[58] Field of Search ........... 354/158, 224, 225, 187, 354/188, 189, 192, 193, 194

[56] References Cited
UNITED STATES PATENTS
3,668,991  6/1972  Erlichman....................... 354/192 X
3,709,131  1/1973  Plummer.............................. 354/158

Primary Examiner—Samuel S. Matthews
Assistant Examiner—E. M. O'Connor
Attorney, Agent, or Firm—Toren, McGeady and Stanger

[57] ABSTRACT

A collapsible single lens reflex camera capable of use with a photographic film of large size comprises a rigid base housing section in which an objective lens and a view finder are fixedly mounted in radially and longitudinally offset positions with respect to each other, and a collapsible housing section positioned beneath said view finder and behind said objective lens and comprising a first housing member carrying a film mount and having an edge pivotally mounted on said base housing, a second housing member carrying a reflecting mirror and having an edge pivotally mounted on the opposite edge of said first housing member to said pivoted edge, and a bellows of which the respective ends are connected to said first and second housing members, said first and second housing member being arranged with respect to the optical axis of said objective lens so that the image-forming light rays after reflected from said mirror are focussed on the film plane.

1 Claim, 4 Drawing Figures

3,877,046

COLLAPSIBLE SINGLES LENS REFLEX CAMERA

This invention relates to single lens reflex cameras and more particularly to a collapsible single lens reflex camera capable of use with a photographic film of large frame size.

Various types of single lens reflex cameras are known, most of which employ the so-called "quick-return" pivotable mirror arranged between the photographing lens and the film to normally intercept the photographic image and to reflect it upwardly into the finder optical system. Upon actuation of the shutter release button, the mirror will pivot upwardly to the blocked position, thus uncovering the shutter and the unavoidably to permit film exposure. Such a rapid pivotal movement of the mirror, however, causes the lens to be generally unavaoidably vibrated, thereby resulting in an undesirable image at the focal plane. Particularly in the case of a camera which is designed to have an increased film frame size, the weight and bulk of the mirror unavoidably increase with increase in the magnitude of vibrations to limit the percentage of photographs which will be found acceptable. Further, as the mirror increases in weight and bulk, its operating mechanism is made quite heavy and bulky, thereby it is made difficult to provide compact single lens reflex cameras.

Accordingly, it is an object of the present invention to overcome the above-mentioned drawbacks attendant on the conventional types of single lens reflex cameras.

Another object of the present invention is to provide a collapsible single lens reflex camera employing a stationary mirror during the exposure operation, and adapted for use with a large frame size of photographic film.

To achieve this, instead of using the pivotal mirror for the finder optical system, the present invention contemplates the use of a light-splitting element positioned in the path of image-carrying light rays within the objective lens system to direct a portion of the image-carrying light rays to the finder optical system. The camera housing is constructed as comprising a collapsible opaque housing section movably mounted on a rigid base housing section containing the objective lens system and finder optical system, said collapsible opaque housing section comprising a first housing member carrying a film mount and pivoted at an edge on said base housing section, a second housing member carrying a reflecting mirror and pivoted at an edge on the opposite free edge of said first housing member to the pivoted edge, a bellows of which respective ends are connected to said first and second housing members, and positioning means pibotally mounted on said base housing section for holding and accurately locating said movable housing members in angular position with respect to each other and to the optical axis of said objective lens system so that the image-forming light rays are reflected from said mirror to focus on the film plane.

A preferred embodiment of the invention will now be described with reference to the accompanying drawings in which.

Figure 1:
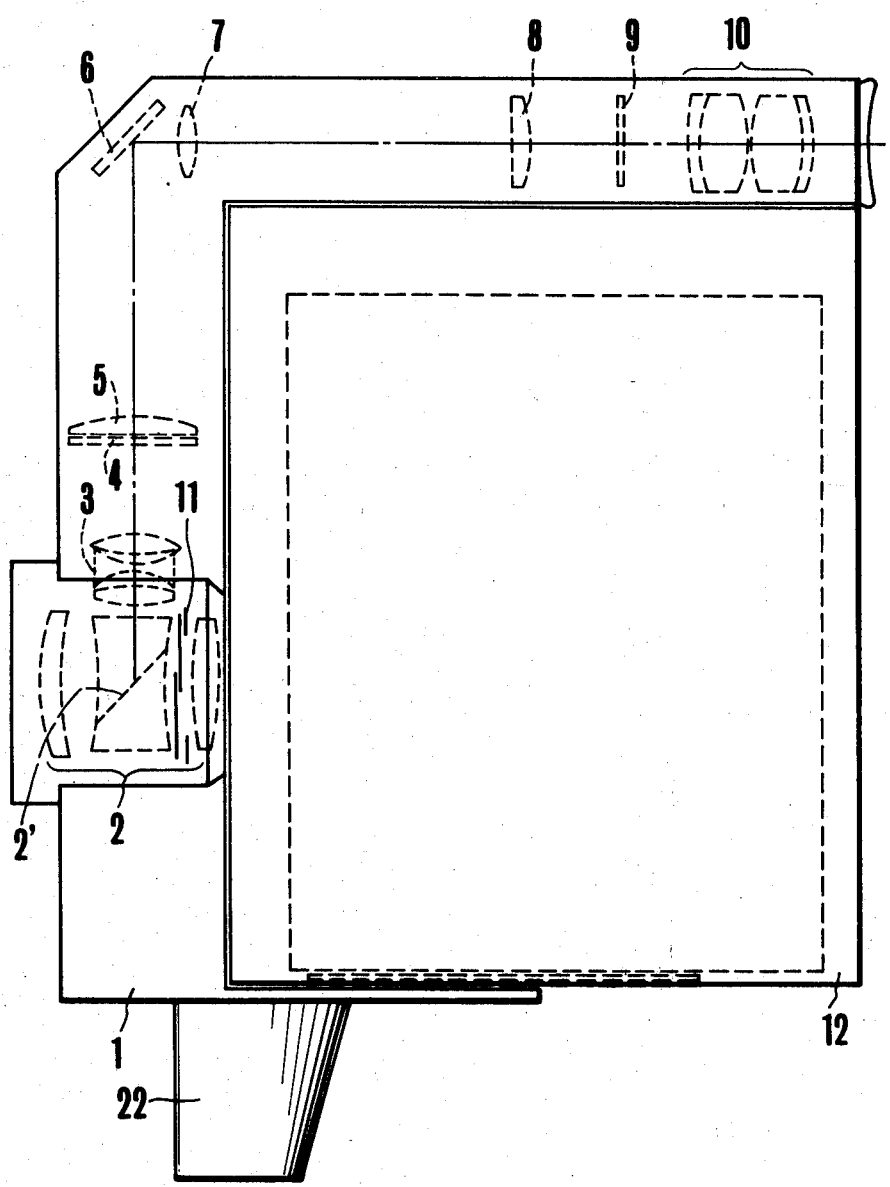
FIG. 1 is a schematic side elevational view of a single lens reflex camera in the fully collapsed position according to the invention.
Figure 2:
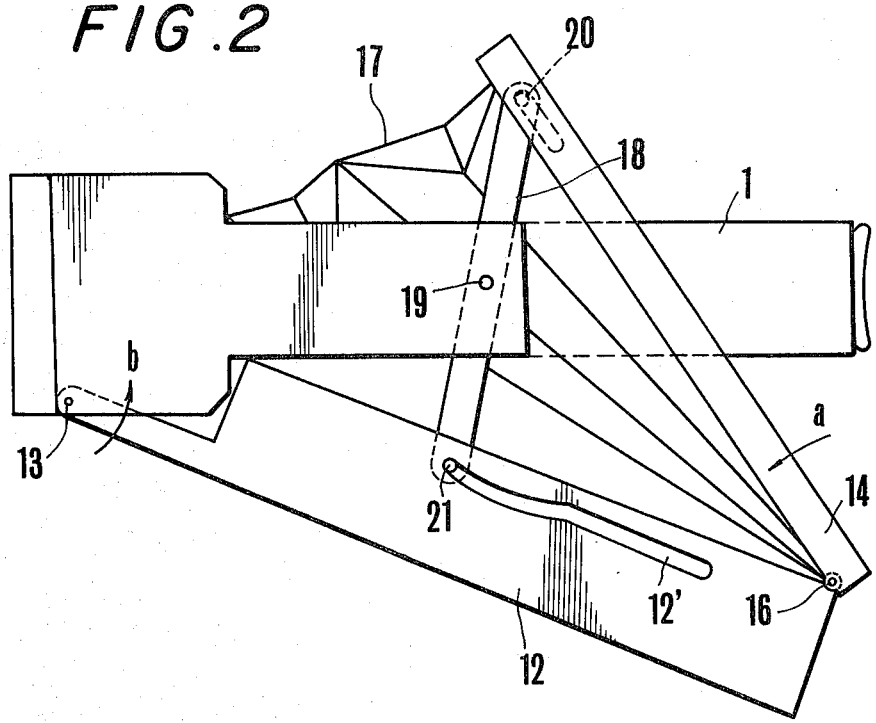
FIG. 2 is a plane view of the camera of FIG. 1 with the movable housing members being disposed in an expanded position for exposure purposes.
Figure 3:
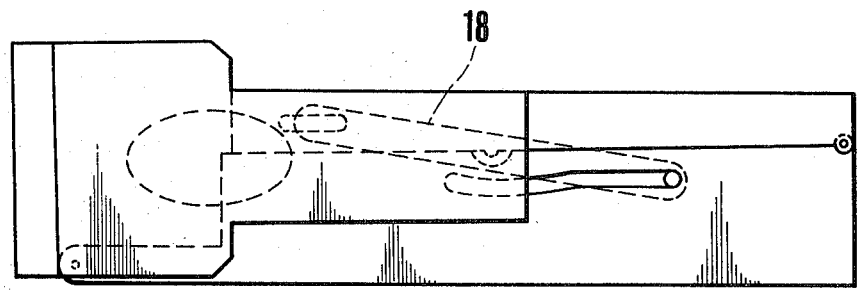
FIG. 3 is a plane view of the camera of FIG. 1 with the movable housing members being disposed in the fully collapsed position.

Referring to FIGS. 1, 2 and 3, the single lens reflex camera constructed in accordance with the present invention is illustrated as comprising a rigid base housing section 1 in which are mounted as shown in FIG. 1 an objective lens system 2, a light-splitting element having a half-mirror 2', exposure control parameter setting means 11 such as a shutter and diaphragm, and a finder optical system including an object lens 3, a first focusing screen 4, a condenser lens 5, a mirror 6, an erecting lens 7, a field lens 8, a second focusing screen 9 and an eye-piece 10, and a collapsible opaque housing section 12 movably mounted on said base housing section 1. As shown in FIG. 2, the housing section 12 comprises a first housing member 12 hinged at 13 on said base housing section 1 and carrying means for receiving and holding a film cassette not shown, a second housing member 14 hinged at 16 on the opposite free edge of said first housing member 12 and carrying a reflecting mirror 15 (FIG. 4) mounted in the inside thereof, and a flexible light-tight seal means 17 such as a bellows of which respective ends are connected to said first and second pivotable housing member 12 and 4 to form an enclosed collapsible opaque chamber. Movably mounted on the bottom wall of the base housing section 1 is a positioning means constructed in the form of a lever 18 which is fulcrumed at 19 and which is provided with pins 20 and 21 mounted on the respective end portions to slidably engage in elongated slots 14' and 12' provided in the bottom walls of the housing members 14 and 12 respectively.

The present invention is concerned with the construction and form of the collapsible single lens reflex camera housing, but it is not particularly related to the optical system, exposure control system and other supplementary devices such as film mount. Therefore, explanation of the elements thereof has been omitted. In the following, consideration will be given to only the operation of the camera housing from an exposing operation position to the fully collapsed position. For exposure purposes, the camera housing is set in a position shown in FIG. 2 wherein said pivotable housing members 12 and 14 are arranged so that the image-forming light reys from the objective lens are reflected by the mirror 15 to focus on the film plane. This arrangement of the pivotable housing members is secured by any suitable lock means not shown known the art during exposure operations. To collapse the opaque chamber defined by the housing members 12 and 14 and the bellows 17, the operator needs only to lock out the lock means and turn the lever 18 in a counter-clockwise direction as viewed in FIG. 2 whereby the housing members 12 and 14 are caused to turn in the directions indicated by arrows, b and a, about the hinges 13 and 16 respectively. In the fully collapsed position as shown in FIG. 3, the lever 18 is locked by any suitable means known in the art to secure the housing members in the fully collapsed position.

Figure 4:
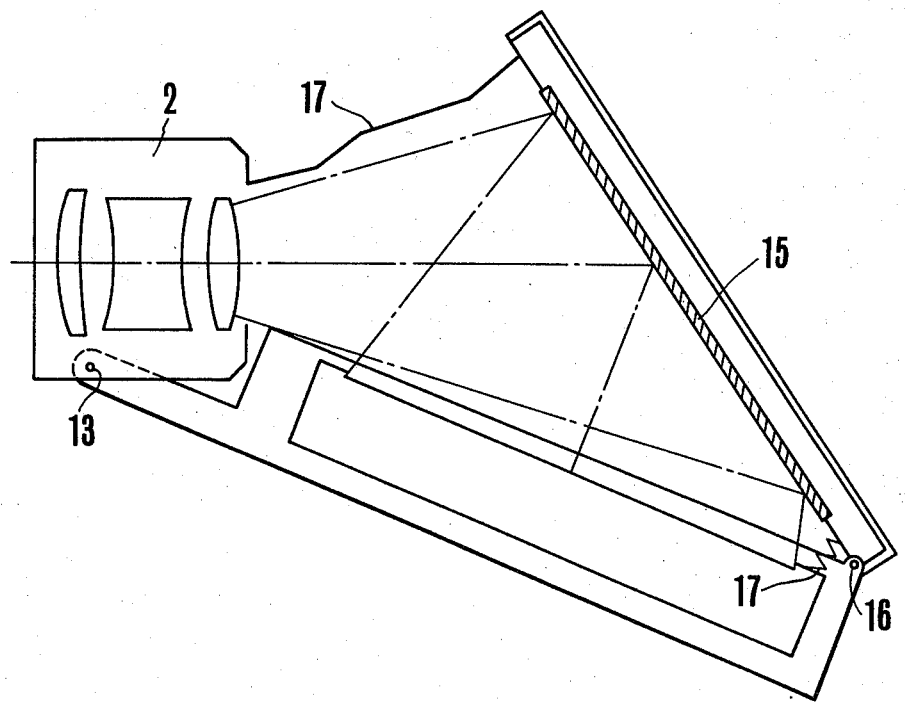
FIG. 4 is a sectional plane view of the camera of FIG. 2 illustrating a principle of focussing the image-forming light rays on the film plane.
Figure 2:
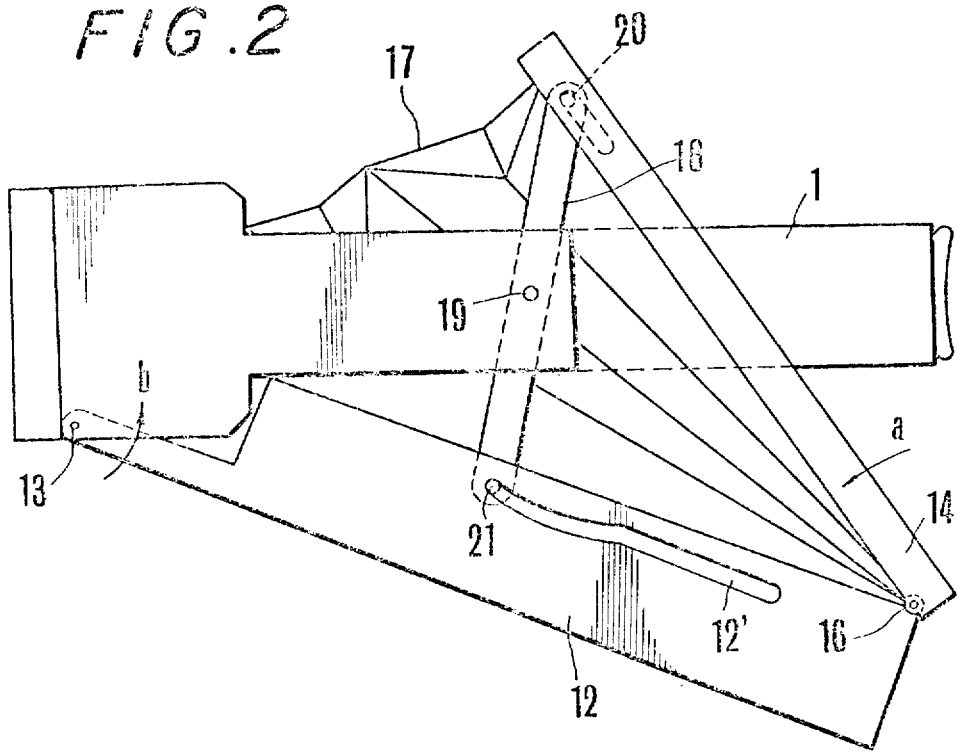
Figure 3:
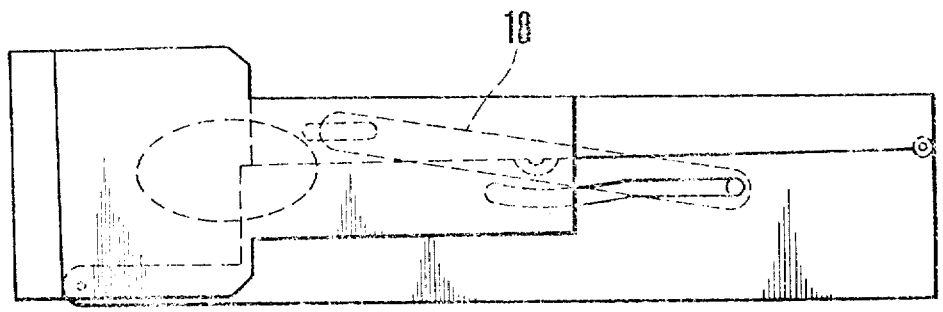

In operation of the camera with the housing set in an exposing operation position as shown in FIG. 4, it is preferred that the camera is vertically disposed during picture-taking operations, because of the arrangement and orientation of the photographing lens 2 and a finder system shown in FIG. 1. When the shutter mechanism not shown is operated to initiate an exposure of the associated photographic film mounted on the housing member 12, the image-forming light rays passing through the opened shutter are directed first to the reflecting mirror 15 mounted on the housing member 14 and then reflected therefrom to the film plane on which an image of an object being photographed is focussed. During this sequence, the camera hand held by the grip 22 (FIG. 1) is not subjected to vibratory motion due to the movement of relatively large constitutional members such as the pivotable mirror which might be effected with otherwise designed cameras. After the exposure operation has been completed, the housing members 12 and 14 carrying the mirror 15 and film cassette with the bellows 17 may be set in the space defined by the rigid base housing section of L-shape, so that the collapsed camera housing is of compact and very handy to carry.

It will be seen from the foregoing description that the present invention provides a collapsible single lens reflex camera housing which when collapsed is of compact structure, and the collapsed camera housing can be readily set for exposure purposes by pulling out in unison the housing members carrying the reflecting mirror and film mount. With the construction of the camera housing of the invention which provides for a remarkably larger film mount space than has been unattainable with the presently proposed single lens reflex cameras, it is possible to design a single lens reflex camera adapted for use with an increased frame size of photographic film without anxiety of introducing vibrations into the lens of the camera.

What is claimed is:

1. A collapsible single lens reflex camera movable from a photographing position to a collapsed position comprising:
   a base housing containing a photographic lens, a finder optical system and a light-splitting element positioned in the path of light rays passing through said photographic lens to direct a portion thereof to said finder optical system;
   a first movable housing member carrying a film mount and having a first edge pivotally mounted on said base housing and a second edge opposite and parallel to said first edge;
   a second movable housing member carrying a reflecting mirror and having a third edge pivotally mounted on the second edge, of said first pivotable housing member;
   a bellows of which the respective open ends are connected to said first and second housing members to form an enclosed collapsible opaque chamber; and
   positioning means interconnecting said first and second movable housing members and pivotally mounted on said base housing to hold and accurately locate said movable housing members in angular position with respect to each other and to the optical axis of said photographic lens so that the image-forming light rays after reflected from said mirror are focussed on the plane of a photographic film mounted on said film mount.

* * * * *

UNITED STATES PATENT OFFICE
CERTIFICATE OF CORRECTION

Patent No. 3,877,046      Dated April 8, 1975

Inventor(s) Kanehiro Sorimachi et al.

It is certified that error appears in the above-identified patent and that said Letters Patent are hereby corrected as shown below:

In the Grant (only) insert Figures 2 and 3, as shown on the attached sheet.

Signed and Sealed this sixth Day of January 1976

[SEAL]

Attest:

RUTH C. MASON
*Attesting Officer*

C. MARSHALL DANN
*Commissioner of Patents and Trademarks*